United States Patent [19]

D'Amato et al.

[11] Patent Number: 5,003,915
[45] Date of Patent: Apr. 2, 1991

[54] APPARATUS FOR PRINTING AND FOR FORMING A HOLOGRAM ON SHEET MATERIAL

[75] Inventors: Salvatore F. D'Amato, Floral Park, N.Y.; Peter Sorbo, Stamford, Conn.; Richard E. Dunning, Claremont, Calif.

[73] Assignee: American Bank Note Holographics, Inc., Elmsford, N.Y.

[21] Appl. No.: 397,585

[22] Filed: Aug. 23, 1989

Related U.S. Application Data

[62] Division of Ser. No. 183,005, Apr. 18, 1988, Pat. No. 4,933,120.

[51] Int. Cl.$^5$ .......................... B05C 1/16; B05D 5/06; B29D 11/00
[52] U.S. Cl. ....................... 118/46; 118/212; 118/216; 118/244; 118/620; 264/1.3; 425/122; 425/174.4; 425/317; 425/447
[58] Field of Search .............. 425/90, 105, 122, 126.1, 425/127, 174.4, 317, 447; 264/1.3, 1.4, 1.7, 1.9, 132; 118/46, 620, 212, 216, 257, 258, 235, 244, 255

[56] References Cited

U.S. PATENT DOCUMENTS

| | | | |
|---|---|---|---|
| 3,565,978 | 2/1971 | Folger et al. | 264/1.3 |
| 3,882,207 | 5/1975 | Hannan et al. | 264/1.3 |
| 4,246,297 | 1/1981 | Nablo et al. | 427/44 |
| 4,294,782 | 10/1981 | Froehlig | 264/1.4 |
| 4,329,385 | 5/1982 | Banks et al. | 428/141 |
| 4,420,502 | 12/1983 | Conley | 427/54.1 |
| 4,427,732 | 1/1984 | Gray, III et al. | 428/172 |
| 4,490,409 | 12/1984 | Nablo et al. | 427/44 |
| 4,521,445 | 6/1985 | Nablo et al. | 427/44 |
| 4,560,578 | 12/1985 | Freeman | 427/44 |
| 4,569,806 | 2/1986 | Holster | 425/174.4 |
| 4,728,377 | 3/1988 | Gallagher | 283/904 |
| 4,758,296 | 7/1988 | McGrew | 264/1.3 |
| 4,836,874 | 6/1989 | Foster | 264/1.3 |
| 4,840,757 | 6/1989 | Blenkhorn | 264/213 |
| 4,933,120 | 6/1990 | D'Amato et al. | 264/13 |

FOREIGN PATENT DOCUMENTS

| | | | |
|---|---|---|---|
| 905064 | 7/1972 | Canada | 425/174.4 |
| 0118143 | 9/1984 | European Pat. Off. | 264/1.3 |
| 62-101438 | 5/1987 | Japan | 264/1.3 |
| 8809252 | 1/1988 | PCT Int'l Appl. | |
| 1264712 | 2/1972 | United Kingdom | 283/904 |
| 1548588 | 7/1979 | United Kingdom | |
| 2019257 | 10/1979 | United Kingdom | |
| 2027441A | 2/1980 | United Kingdom | |

OTHER PUBLICATIONS

Nablo et al., "Advances in Electron Curing for High Speed Converting", 1978 Paper Synthetic Conference, TAPPI, 1978.

Tripp, "Recent Development in Electron Beam Curing", presented at Radcure in Europe, May, 1987, pp. 10-9 to 10-15.

Primary Examiner—James C. Housael
Attorney, Agent, or Firm—Majestic, Parsons, Siebert & Hsue

[57] ABSTRACT

A technique and apparatus for printing that includes the formation of a hologram, or other type of diffraction pattern, directly on a desired end product of paper, or other sheet material. The hologram, or other diffraction pattern, is formed by casting a surface relief pattern directly onto the sheet material in a limited area.

8 Claims, 2 Drawing Sheets

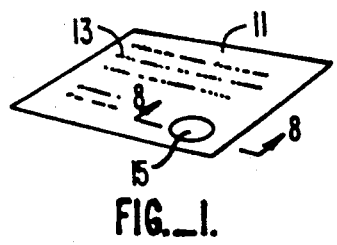
FIG._1.
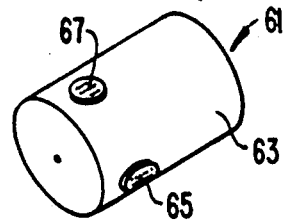
FIG._4.
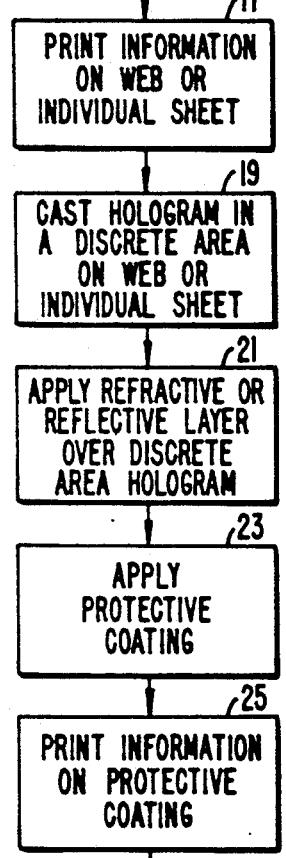
FIG._2.
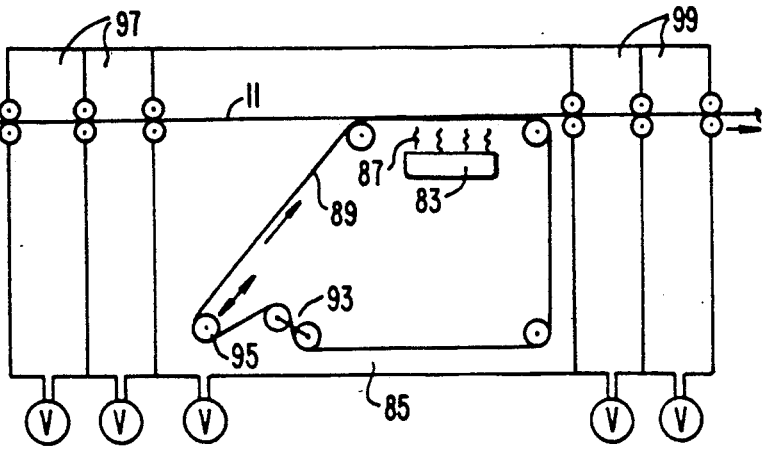
FIG._5.
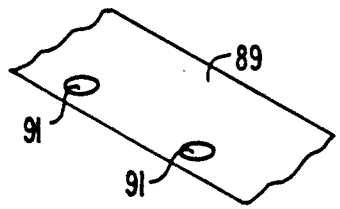
FIG._6.
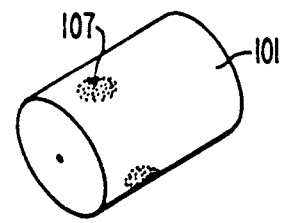
FIG._7.
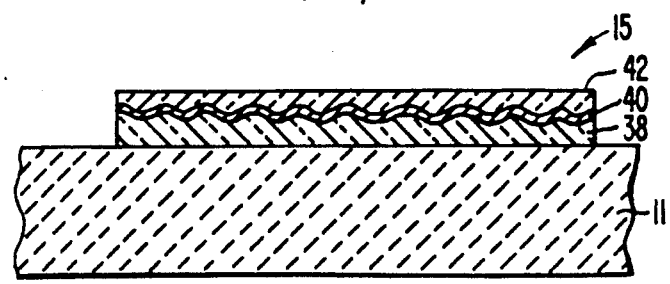
FIG._8.

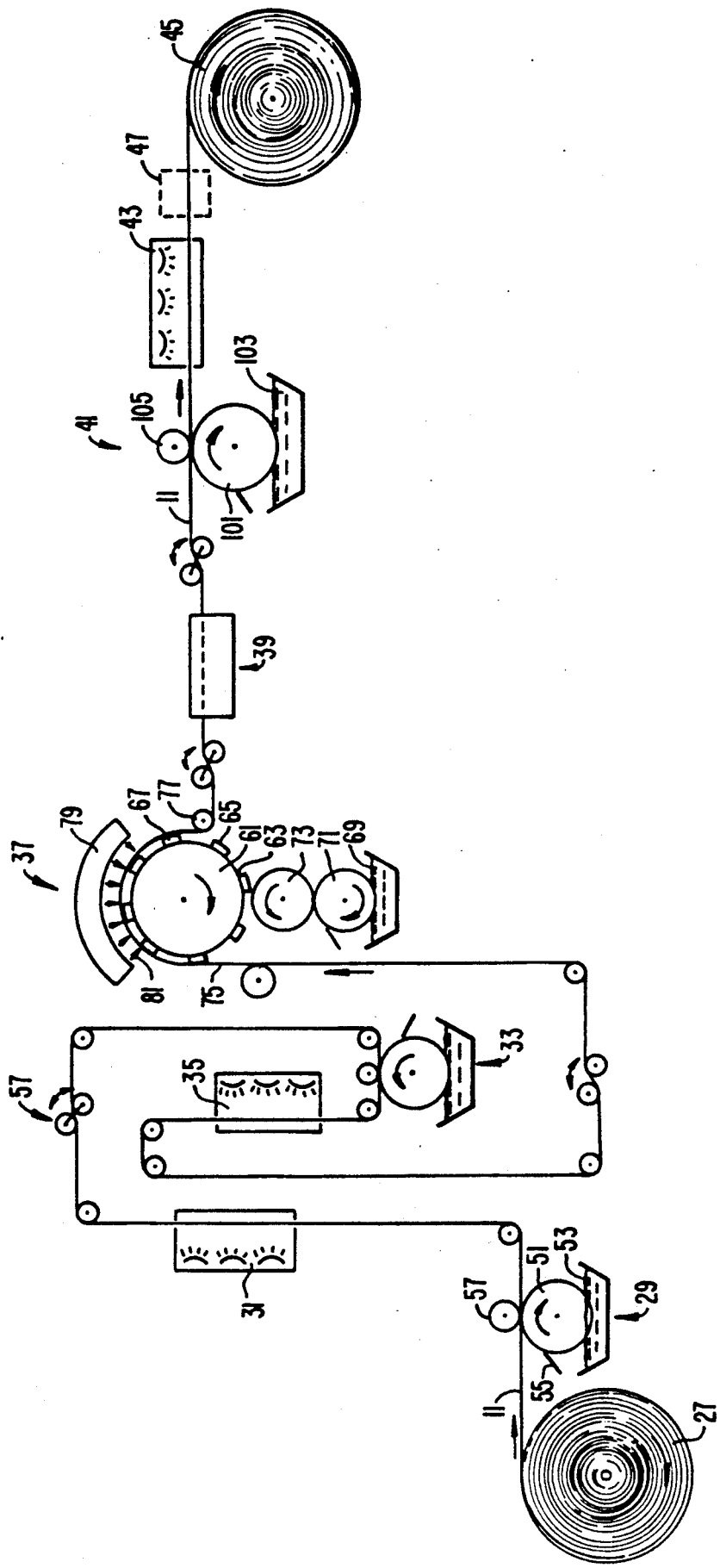
FIG._3.

APPARATUS FOR PRINTING AND FOR FORMING A HOLOGRAM ON SHEET MATERIAL

This is a division of application Ser. No. 183,005, filed Apr. 18, 1988, U.S. Pat. No. 4,933,120.

BACKGROUND OF THE INVENTION

This invention relates generally to the formation of a hologram on a document or other article as part of a printing process.

Holograms and other types of diffraction gratings are commonly attached to a document or other article containing printing. An example is the attachment of holograms to credit cards in order to authenticate their genuineness and increase the difficulty of counterfeit credit cards being used. Holograms are used, or proposed to be used, as anti-counterfeiting devices on a number of other types of documents, such as stock certificates, identification badges, passports, and even currency Holograms are also attached to printed documents and articles for other reasons, such as their decorative effect.

The predominant method of manufacturing such documents and articles currently being practiced involves separately manufacturing the printed document and the hologram, and then, as a last step, attaching the hologram to the printed document or article. The holograms are generally manufactured in the form of a roll of material, either having a simple pressure-sensitive adhesive on one side for attachment to such a document or article, or in the form of hot-stamped foil wherein the hologram is released from a carrier and attached to a document or article by application of heat and pressure. In either case, the hologram usually carries the holographic information in a surface relief pattern that is formed either by embossing into a film or by casting a liquid resin. The resulting surface relief pattern is metallized in order to form a reflective surface which diffracts incident viewing light into formation of a reconstructed image.

It is a primary object of the present invention to improve the efficiency, and thus reduce the cost, of the process for manufacturing documents or other articles that contain both printing and a hologram or other type of diffraction grating attached thereto.

SUMMARY OF THE INVENTION

This and additional objects are accomplished by the various aspects of the present invention, wherein, briefly and generally, holograms are formed directly on documents, sheets or other article substrates as part of a printing process. The printing and hologram formation may be accomplished in a single, continuous process, wherein blank sheet material, such as paper, is sequentially passed through printing and hologram forming stations, either as individual sheets or articles or as part of a continuous web thereof. Alternatively, the printing and hologram formation steps may be performed in separate discrete steps.

In a preferred form of the invention, the hologram is formed by casting directly onto the document or article in a specifically defined area thereof, followed by coating with a reflective or refractive material only that region of the sheet or article where the hologram has been cast. Printing of the sheet or other article can be performed either before, or after (or both before and after) the formation of the complete hologram, depending on the particular application.

Additional objects, features and advantages of the various aspects of the present invention are included in the following description of its preferred embodiment, which description should be taken in conjunction with the accompanying drawings.

BRIEF DESCRIPTION OF THE DRAWINGS

FIG. 1 illustrates an example of a document manufactured by the process of the present invention;

FIG. 2 outlines the steps of the process followed in manufacturing the document of FIG. 1;

FIG. 3 schematically illustrates an example continuous process for manufacturing articles of the type illustrated in FIG. 1 in carrying out the method outlined in FIG. 2;

FIG. 4 shows a component of the apparatus used in FIG. 3;

FIG. 5 shows another component of the apparatus shown in FIG. 3;

FIG. 6 shows a piece of the component of FIG. 5;

FIG. 7 shows yet another component of the continuous process apparatus of FIG. 3; and FIG. 8 illustrates an enlarged cross-sectional view of the hologram of the example document of FIG. 1 taken at section 8—8 thereof.

DESCRIPTION OF THE PREFERRED EMBODIMENTS

Initially referring to FIG. 1, an example is shown of a document that is manufactured by the process to be described. A cut sheet of paper 11 contains printed information 13 and a hologram 15 attached to at least one surface. An example of such a document is a stock certificate, where the hologram serves to authenticate the genuineness of the document. In some cases, the hologram 15 is applied to a region of the document 11 that contains none of the printing 13, and nothing is printed over the hologram 15. In other cases, it is either more convenient or desired for aesthetic reasons to either form the hologram 15 on the sheet 11 in a region that has already been printed upon, or will be printed upon after the hologram is formed.

The process to be described as an example utilizing the various aspects of the present invention accomplishes the printing and hologram formation on a blank sheet as part of a continuous process. This may be accomplished on individual pre-cut blank sheets, or, as described with respect to the example of FIG. 3, a continuous web of sheet material Although paper is being used in the examples being described as the substrate upon which the printing and hologram formation occur, other flexible material, such as plastic film, may also be processed according to the techniques being described. Additionally, less flexible materials, such as stiff paper or cardboard, and substantially rigid materials, such as plastic used for credit cards and the like, can be processed in the manner to be described. Of course, for substantially rigid articles to be manufactured, individually cut sheets or blanks will be processed rather than a continuous web of such material, since a length of it cannot easily be changed in direction around rollers, unless small blanks are attached to a web. Alternatively, to make rigid articles, flexible material may first be processed by printing and the formation of a hologram thereon, and then that material is formed into the rigid article by attachment to additional layers that render the end product substantially rigid.

FIG. 2 outlines very generally the combined printing and hologram formation steps involved in manufacturing the product of FIG. 1. A first step 17 is to print the information 13 on the sheet material 11. Next, in a step 19, the hologram 15 is partially formed by casting a surface relief pattern with liquid resin on the discrete area where the hologram is to be formed, and then curing that resin until it is firm, as described more fully hereinafter. A next step 21 applies a thin layer of material to the surface relief pattern of the cured resin so that light is reflected from it and diffracted into an image of an object or light pattern that was utilized when the master hologram being replicated was initially made. This layer is most commonly a reflective metal material, usually aluminum. A next step 23 applies a protective coating over the hologram, if necessary, this step being optional. In a final optional step 25, information is printed over that protective coating when desired for special visual effects. Additionally, the printing step 17 can be performed after the hologram has been formed on the sheet 11, namely after step 23, rather than as an initial step as indicated in FIG. 2, but that is usually less desirable.

Throughout this description, a hologram 15 is specified to be formed on the sheet material since, for most applications, a hologram is a preferred form of optical device. However, other diffraction gratings not considered to be holograms may also be useful, depending upon the application. In applications where the hologram is being used to authenticate the document or article on which it is formed as an anti-counterfeiting device, it is generally desirable to use a hologram that reconstructs an image of a three-dimensional object since that type of device is most difficult to counterfeit. Such a hologram is also preferred for many product packaging, advertising, and other non-authenticating commercial applications. However, devices that diffract light into something other than a focused image are also useful in many commercial applications, and can even be useful in anti-counterfeiting applications if the light pattern is easily recognizable to distinguish a genuine from a counterfeit document or article The process being described herein is suitable for the formation of nearly all such holograms or diffraction gratings.

Referring to FIG. 3, a form of a printing press is illustrated to have a stage included for forming a hologram in a printing-like way. This example is of a continuous process that utilizes the various aspects of the present invention. A roll 27 of a continuous web of flexible sheet material, blank paper in this example, is the raw material upon which the printing and hologram are formed in a single process.

The first step in the process, indicated by step 17 of FIG. 2, is to print information on the paper. In this example, information is so printed on both sides of the paper. A first printing station 29 does so on one side, followed by drying the ink in an oven 31. Printing on the other side of the paper 11 is accomplished by a process station 33, followed by passing the sheet material through a dryer 35 Of course, one of the printing stations 29 or 33 could be eliminated, depending upon the application.

A processing station 37 that follows the printing stations accomplishes the first step in forming a hologram on the same side of the paper on which printing is accomplished by the station 29. That first hologram forming step, indicated as step 19 in FIG. 2, forms a casting of a surface relief pattern of the hologram or diffraction grating being formed. This casting is shown at 38 on the cross-sectional view of FIG. 8. It is attached to the substrate paper 11. A next major step in the process of FIG. 3 is accomplished by processing station 39 which adds a thin layer 40 of a reflective film or refractive layer to the structure illustrated in FIG. 8. The usual material for the layer 40 is a reflective metal, such as a thin layer of aluminum. This corresponds to the step 21 of FIG. 2. Next, according to the step 23 of FIG. 2, a optional protective coating 40 (FIG. 8) may be applied over the reflective film or refractive layer 40 by a processing station 41 (FIG. 3) for those applications requiring such protection. Drying and hardening of the layer 42 is accelerated by passing the web through an oven 43.

The long web of the continuous number of documents so formed may alternatively be either rolled into a roll 45 for later cutting into the individual documents, or may be so cut as part of the continuous process being described. Additionally, before such cutting or rolling of the web, an optional step 47 shown in dotted outlines may be accomplished. That optional step can be the overprinting of information on the protective coating 42, as indicated by step 25 of FIG. 2. Also, as previously described, the entire printing operation, described in FIG. 3 to occur initially in the process, can alternatively be relocated to the position indicated at 47, after the hologram is formed.

Although a continuous process of forming a document or article is described with respect to FIG. 3, an alternative is to first process an entire length of continuous web or full stack of individual sheets of documents or articles with less than all of the processing steps illustrated in FIGS. 2 and 3 before any of them are treated with any of the subsequent processes. The partially treated web or sheets are then passed through the other processing stations as a unit. For example, the printing of step 17 (FIG. 2) and processing stations 29 and 33 may first be completed on an entire length of continuous web or full stack of sheets, followed by that web or stack then being passed through the processing stations 37, 39 and 41 in order to form a hologram on each document according to the steps 19-23 of FIG. 2.

Preferred forms of the processing stations of FIG. 3 will now be described. One of many possible standard printing techniques is schematically illustrated for printing station 29, the use of a Gravure cylinder 51. Such a cylinder typically has a very smooth surface except for carefully machined indentations arranged in a desired printing pattern. Ink is applied to the surface of the cylinder 51 as it is rotated, illustrated in FIG. 3 as an ink reservoir 53 through which the cylinder 51 rotates its external surface. A blade 55 wipes off any excess ink from the outside of the cylinder 51 before its surface contacts the sheet material 11. Upon contact, ink carried by the holes in the cylinder is transferred to the sheet material 11. An impression roller 57 maintains the sheet material in close contact with the cylinder 51. Of course, other known printing techniques may be utilized in this stage of the process in place of that specifically illustrated, such as a flexographic, offset or silk screen technique.

If printing is desired on the back side of the sheet as well, the printing station 33 is provided and most conveniently is of the same type as that chosen for the printing station 29. Between stations 29 and 33 is a registration compensator 57 that operates to adjust the total path length of the sheet between the two printing stations. As is typical in any such printing process, registration marks are initially applied to edges of the continuous web sheet material and these marks are detected at specific locations along the length of the web by appropriate sensors (not shown). Signals from these sensors then cause operation of path length compensators, such as that indicated at 57, so that the printing done by one station is in proper registration with that done by another station. Such a registration compensator is desirably positioned between each major station in the process illustrated in FIG. 3, as is indicated thereon.

The next station 37 accomplished a first step of forming the hologram 15. That step simultaneously performs two operations: (1) a quantity of liquid resin is applied to the appropriately defined, discrete area of the sheet material 11 where the hologram is to be formed, and (2) molds that resin to contain a surface relief pattern of a master hologram and cures the resin into a hardened state. The result of the processing stage 37 is the layer 38 (FIG. 8) of the hologram without the layers 40 and 42 having yet been applied. It is possible for the process to independently perform the two operations enumerated above, but it is preferred to do so in a single operation in order to eliminate having to carefully register the second operation with the first.

The processing stage 37 includes a cylinder 61 having a generally smooth cylindrical surface 63 except for a plurality of raised portions 65, 67, etc. A perspective view of such a cylinder 61 is given in FIG. 4. Each of the raised portions 65, 67, etc. contain on their outer surface a surface relief pattern in a hard material that corresponds to the hologram or other diffraction pattern to be formed on the sheet material 11. As is well known, such a surface relief pattern is initially optically formed in photoresist or similar material, and then a metal master hologram is made from that delicate photoresist master by an electrolysis technique. Such a master hologram can then be used to make sub-master holograms, all of which have the same surface relief pattern as the initial optically made photoresist master. It is the sub-master holograms that are mounted on the raised portions 65, 67 etc. of the cylinder 61.

Liquid resin material, indicated schematically as a reservoir 69 in FIG. 3, is transferred to the surface relief masters on the raised portions 65 and 67 by an anilox roll 71 and an elastomeric transfer roll 73. The roll 71 is like a Gravure cylinder but has holes over substantially its entire surface for uniformly transferring liquid from the reservoir 69 to the elastomeric roll 73. The roll 73 is positioned with respect to the cylinder 61 so that it contacts the raised portion 65, 67 etc. but does not contact the smooth surface 63. The elastomeric nature of the roll 73 also allows the transfer to be accomplished without damaging the very fine detail of the surface relief pattern carried by the raised portions 65 and 67. This, in combination with guiding the sheet material 11 around the roll 61 so that it too does not contact the surface 63, limits placement of the liquid resin on the sheet material 11 to only those areas where it is desired to form a hologram.

The resin utilized for the hologram may be chosen from a number of known compounds that are currently used for coating sheet material in a manner to form a decorative pattern. Of course, a specific compound selected must be compatible with the very fine groove pattern of the surface relief hologram sub-masters that serve as a mold for the resin.

A hologram master containing raised portions of the cylinder 61 first contacts the continuous web sheet material 11 at about a location indicated at 75 and stays in contact with the sheet material, without any relative movement therebetween, until it has been rotated to a position in the vicinity of a guide roller 77. In that interval, the resin trapped between the raised portions of the cylinder 61 and the sheet material is cured in order to harden it. This is accomplished by directing a source 79 of actinic radiation 81 through the sheet material 11 to the trapped resin. The type of radiation that is used depends primarily upon the particular resin formulation and the nature of the sheet material 11. For sheet material of paper or other opaque substances, electron beam radiation is preferable. For optically transparent sheet material, either totally or partially, ultraviolet radiation can alternatively be used. When a raised portion of the cylinder 61 has been rotated around to the vicinity of the roller 77, a liquid resin is firmly attached to the sheet material and has been molded to carry the surface relief pattern of the master hologram.

There are several ways in which a reflective coating 40 (FIG. 8) can then be applied to the surface relief pattern. It is preferable to directly apply the reflective material only to the area of the sheet material where the hologram replica is being formed. Alternatively, the entire sheet can be coated with a reflective layer, such a aluminum, and then that portion of the layer outside the area of the hologram can be removed by known photoresist masking and etching techniques. Such a removal is not, however, appropriate for many types of sheet material substrates, such as paper, and further is not desired where printing has already been accomplished since etching of the reflective material layer can also remove the printing. Therefore, the preferred technique illustrated with respect to the drawings particularly FIG. 5 thereof, applies a thin reflective aluminum layer 40 (FIG. 8) in registration with the area of the cured resin 38.

FIG. 5 shows a schematic cut-away view of a discrete area metallizer of a known type. A bath 83 of molten aluminum is heated within a vacuum chamber 85 until it is boiling. Vapor 87 coming off the boiling aluminum liquid condenses on those portions of the sheet material 11 not obscured by a mask 89. As shown in FIG. 6, the mask 89 is solid except for a plurality of periodically spaced holes 91 that are positioned to correspond with the locations on the sheet material 11 where the hologram is being formed. The mask 89 is a continuous belt that is guided by roller in a path that contacts the sheet web material 11 as it passes through the vacuum chamber 85. An appropriate registration device 93, along with a positionable roller 95, allows relative adjustment of the masked holes 91 with respect to the sheet material 11, using known techniques and equipment. A supply of aluminum is provided for the container 83 in order to replace that which is vaporized and condensed on the sheet material 11 and mask 89. As is well known, an input to the vacuum chamber 85 includes a plurality of air-lock chambers 97 and its output similarly includes a plurality of air-lock chambers 99.

Other techniques and apparatus may also be used for discrete area metallization. The sputtering of aluminum onto the sheet material 11 in designated areas is a possibility, but sputtering equipment is generally quite complicated. A silver reduction technique is a possibility, wherein one reacting component is included in the resin material which is, as described, only applied to that area of the sheet material 11 where the hologram is to be positioned. Subsequently, another reacting component may be sprayed in a fine mist over the entire sheet material 11, reacting only with the component in the resin to form a thin reflective layer only on the surface relief pattern. The material sprayed over the rest of the sheet will have no effect.

Although use of a reflective layer is generally preferred for the layer 40, an alternative is to coat the surface relief pattern on the surface of the cast layer 38 with a substantially transparent material having a refractive index that is significantly different than that of the resin layer material. Light is then diffracted from the surface relief pattern at the interface of those two layers. The top layer will generally be smooth on its top surface and no other protective layer is required.

A next optional step, which unnecessary to form an operable hologram but often desirable to protect the hologram that has already been formed, is to coat the metallized layer 40 (FIG. 8) with an optically clear layer 42 that provides physical protection against abrasion and the like. The layer 42 also provides a surface on which a pattern or information may optionally be printed after the hologram is complete. It is generally desirable to limit the formation of the protective coating 42 to the area of the sheet 11 where the hologram is being formed, although for certain applications and products it may be desirable to coat the entire surface. The processing station 41 of FIG. 3 is designed to overcoat only the hologram and utilizes as a primary component thereof another Gravure cylinder 101 which transfers a liquid coating material from a supply indicated as a bath 103 to the sheet material 11. The sheet material 11 is forced to contact the cylinder 101 by an impression roller 105. As shown in FIG. 7, the cylinder 101 has its large number of liquid retaining holes grouped in a plurality of patterns, such as the pattern 107, that corresponds to the shape of the hologram being formed. Thus, with the additional use of existing web registration techniques used in the printing industry, liquid from the reservoir 103 is applied only to the area of the hologram.

Although the various aspects of the present invention have been described with respect to its preferred embodiments and specific examples thereof, it will be understood that the invention will be entitled to protection within the full scope of the appended claims.

It is claimed:

1. Apparatus for processing a substrate, comprising:
   means including a source of said substrate for continuously moving said substrate through at least first and second work stations in succession,
   one of said first and second work stations including means for repeatedly forming a plurality of discrete surface relief light diffraction patterns on at least one side of said substrate, said diffraction pattern forming means including:
   a master of said surface relief light diffraction pattern,
   a source of a liquid casting resin,
   means receiving resin from said source for holding resin between the substrate and the master surface relief pattern in a defined area surrounded by substrate without resin applied thereto and for a period of time without relative movement therebetween,
   means including a source of radiation directed at said held resin for curing said resin into a hardened state within said period of time, and
   means for separating the substrate from the master after said period of time, thereby to leave the hardened resin in place on said substrate with the surface relief light diffraction pattern of said master contained therein, and
   another of said first and second work stations including means for printing a given visual pattern with ink on at least regions of said at least one substrate side not occupied by said hardened resin diffraction pattern.

2. The apparatus according to claim 1 wherein said diffraction pattern forming means is positioned at said first work station and said visual pattern printing means is positioned at said second work station.

3. The apparatus according to claim 1 wherein said visual pattern printing means is positioned at said first work station and said diffraction pattern forming means is positioned at said second work station.

4. The apparatus according to any one of claims 1–3 wherein said source of substrate includes means for handling a roll of a continuous web flexible material.

5. The apparatus according to any one of claims 1–3 wherein said printing means includes means for printing substantially only in regions of said substrate not occupied by said hardened resin diffraction pattern.

6. The apparatus according to any one of claims 1–3 wherein said surface relief master includes a hologram characterized by reconstructing a three-dimensional image when illuminated by light.

7. The apparatus according to claim 1 wherein said resin holding means includes a continuous surface carrying said surface relief master in a manner maintaining an area therearound on the continuous surface without a surface relief master, and means receiving resin from said source for applying resin to said surface relief master without applying resin to said continuous surface in the area therearound.

8. The apparatus according to claim 7 wherein said surface relief master is located in a portion of the continuous surface that is raised relative to the area therearound.

* * * * *